US011601367B2

United States Patent
Delos Reyes et al.

(10) Patent No.: US 11,601,367 B2
(45) Date of Patent: Mar. 7, 2023

(54) SYSTEMS AND METHODS FOR DYNAMIC NETWORK FUNCTION RESOURCE ALLOCATION THROUGH THE NETWORK REPOSITORY FUNCTION

(71) Applicant: Verizon Patent and Licensing Inc., Basking Ridge, NJ (US)

(72) Inventors: Emerando M. Delos Reyes, Pleasant Hill, CA (US); Parry Cornell Booker, Arlington, TX (US); Suzann Hua, Beverly Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 9 days.

(21) Appl. No.: 17/335,991

(22) Filed: Jun. 1, 2021

(65) Prior Publication Data

US 2022/0385581 A1    Dec. 1, 2022

(51) Int. Cl.
*H04L 47/125* (2022.01)
*H04L 43/062* (2022.01)
*H04L 43/067* (2022.01)

(52) U.S. Cl.
CPC .......... *H04L 47/125* (2013.01); *H04L 43/062* (2013.01); *H04L 43/067* (2013.01)

(58) Field of Classification Search
CPC ......... H04L 47/10; H04L 47/11; H04L 47/12; H04L 47/122; H04L 47/125; H04L 43/062; H04L 43/067
See application file for complete search history.

(56) References Cited

U.S. PATENT DOCUMENTS

| | | | | |
|---|---|---|---|---|
| 10,772,062 B1* | 9/2020 | Albasheir | ............. | H04W 48/16 |
| 10,791,044 B1* | 9/2020 | Krishan | ................... | H04L 43/50 |
| 2020/0127916 A1* | 4/2020 | Krishan | ................. | H04L 47/125 |
| 2020/0136911 A1* | 4/2020 | Assali | ................... | H04L 67/101 |
| 2020/0305118 A1* | 9/2020 | Ryu | ....................... | H04W 76/10 |
| 2020/0314672 A1* | 10/2020 | Farooq | ..................... | H04W 4/00 |
| 2021/0014141 A1* | 1/2021 | Patil | ...................... | H04W 24/02 |
| 2022/0132358 A1* | 4/2022 | Peng | ................. | H04W 28/0289 |

FOREIGN PATENT DOCUMENTS

| | | | | | |
|---|---|---|---|---|---|
| CA | 2825441 | A1 * | 8/2012 | ............. | H04L 47/20 |
| EP | 3800930 | A1 * | 4/2021 | | |
| EP | 3873031 | A1 * | 9/2021 | | |
| WO | WO-2016146494 | A1 * | 9/2016 | ......... | G06F 9/45558 |
| WO | WO-2016146878 | A1 * | 9/2016 | ......... | G06F 9/45558 |
| WO | WO-2020249201 | A1 * | 12/2020 | ............... | H04L 1/08 |

\* cited by examiner

Primary Examiner — Kevin D Mew

(57) ABSTRACT

A device may include a processor configured to register a network function, of a core network associated with a radio access network, in a network function repository for the core network. The processor may be further configured to obtain load information for the network function, wherein the load information indicates a load associated with the network function during a time period; determine that the load associated with the network function has reached a threshold based on the load information; and send an alert to an orchestration system to adjust a capacity for the network function, in response to determining that the load associated with the network function has reached the threshold.

20 Claims, 8 Drawing Sheets

| | | 650 | |
|---|---|---|---|
| NF ID 610 | | | |
| NF TYPE 612 | | | |
| NF IP ADDRESS 614 | | | |
| NF POD NAME 616 | | | |
| NF POD IP ADDRESS 618 | | | |
| | MIN LOAD 652 | AVG LOAD 654 | MAX LOAD 656 |
| OVERALL LOAD 620 | | | |
| PROCESSOR LOAD 622 | | | |
| MEMORY LOAD 624 | | | |
| STORAGE LOAD 626 | | | |
| DISCOVERY SERVICE 628 | | | |
| REGISTRATION SERVICE 630 | | | |
| UPDATE SERVICE 632 | | | |
| DEREGISTRATION SERVICE 634 | | | |
| STATUS SUBSCRIPTION SERVICE 636 | | | |
| STATUS NOTIFICATION SERVICE 638 | | | |
| STATUS UN-SUBSCRIPTION SERVICE 640 | | | |

SYSTEMS AND METHODS FOR DYNAMIC NETWORK FUNCTION RESOURCE ALLOCATION THROUGH THE NETWORK REPOSITORY FUNCTION

BACKGROUND INFORMATION

To satisfy the needs and demands of users of mobile communication devices, providers of wireless communication services continue to improve and expand available services as well as networks used to deliver such services. One aspect of such improvements includes enabling mobile communication devices to access and use various services via the provider's communication network. The communications network may need to provide different types of services to a large number of diverse devices under various types of conditions. Managing a large number of different services under different conditions poses various challenges.

BRIEF DESCRIPTION OF THE DRAWINGS

FIG. 6 is a diagram illustrating exemplary components of a load database according to an implementation described herein;

DETAILED DESCRIPTION OF PREFERRED EMBODIMENTS

Figure 1:
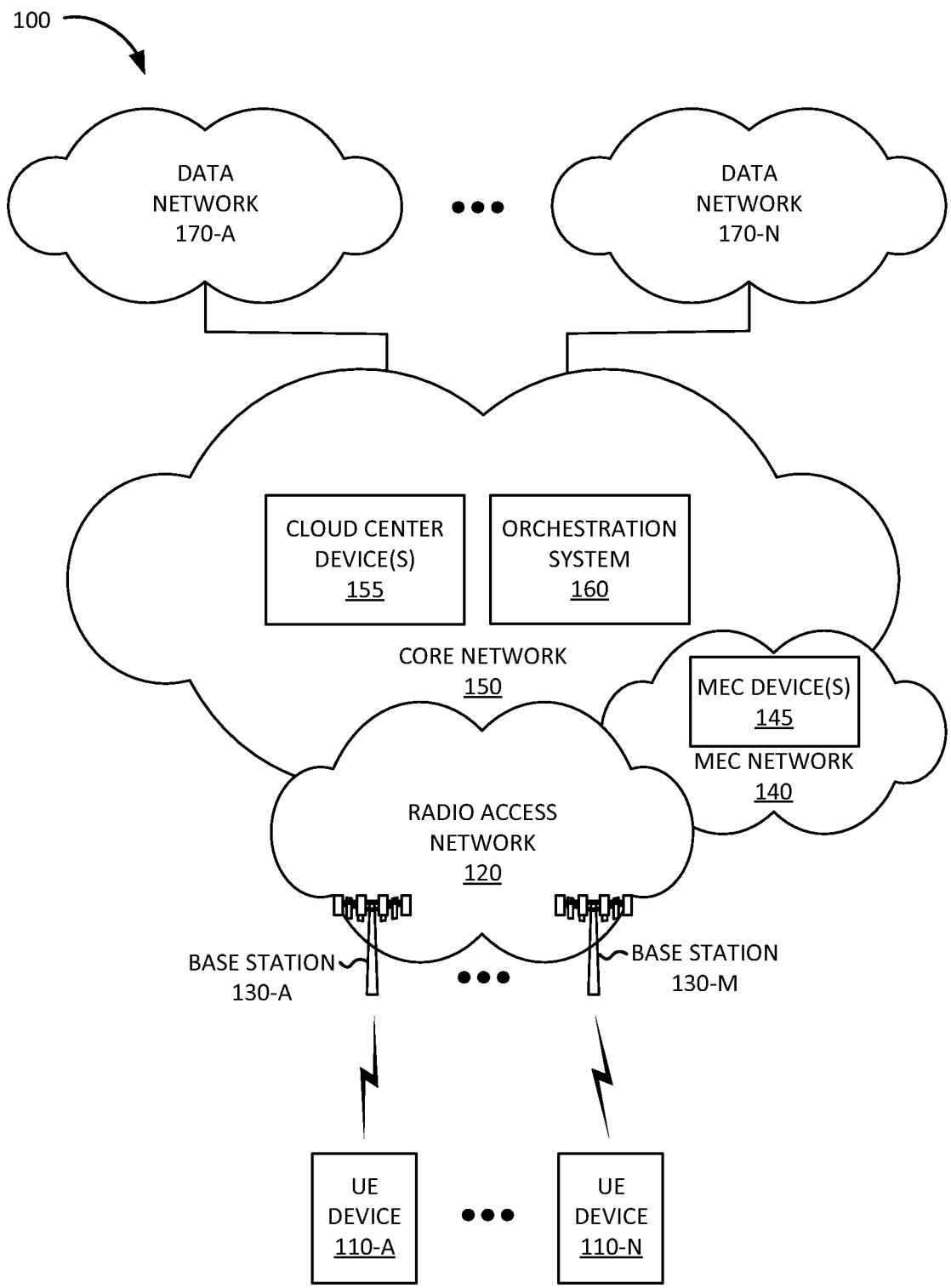
FIG. 1 illustrates an environment according to an implementation described herein.

The following detailed description refers to the accompanying drawings. The same reference numbers in different drawings identify the same or similar elements.

As communication networks and services increase in size, complexity, and number of users, management of the communication networks has become more complex. One way in which wireless networks are becoming more complicated is by incorporating various aspects of next generation networks, such as $5^{th}$ generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) radio access technology (RAT) may provide significant improvements in bandwidth and/or latency over other wireless network technologies. Additionally, a 5G core network supports and manages 5G radio access networks (RAN) that include base stations, which provide various services and enable connections to other networks (e.g., connections to the Internet, etc.). As an example, a 5G core network may provide support for enhanced Mobile Broadband (eMBB), ultra-reliable low latency communication (URLLC), massive Machine Type Communication (mMTC), and/or other types of communications.

In order to implement a functionality, such as Internet Protocol (IP) connectivity between a user device (UE) and a data network, a 5G core network may include various network nodes, known as network functions (NFs). NFs in a core network and/or cloud computing center may be virtualized. Virtualization has traditionally been implemented using virtual machines. Virtual machines are generated on a physical platform using a virtual machine monitor, also referred to as a hypervisor. Each virtual machine runs its own instance of an operating system (OS), libraries, and binary executable files. However, because each virtual machine includes a separate instance of an operating system, deploying new virtual machines is costly in terms of memory and processing power, adds complexity to a software development cycle, and limits the portability of applications implemented using virtual machines between platforms with different types of physical architectures.

In order to address these issues, container-based virtualization technology has been developed. Container-based virtualization, sometimes referred to as OS-level virtualization, enables multiple isolated user space instances to use the same OS instance and/or kernel space. The isolated user space instances are referred to as containers. A container may have its own set of libraries and binary executable files, and/or its own dedicated share of hardware resources, but may share a kernel space with other containers. Since containers are decoupled from the underlying infrastructure, containers may be portable across cloud centers and OS distributions.

During deployment, each NF is allocated portions of the infrastructure resources based on expected utilization, such as the expected demand from UE devices accessing the services of the NF. However, an NF may experience fluctuations in the utilization of its resources based on the load the NF is experiencing at any point in time due to changing user demand, network outages, natural disasters or other unusual events, etc. For example, if a large number of UE devices have active sessions that use the services of the NF, the load of the NF may increase to the point that the allocated resources are not sufficient to handle all the active sessions. Such a large load may therefore deplete the resources of the NF to the point that the NF is unable to function, resulting in inefficient use of network resources, poor performance, and/or an unsatisfactory user experience. However, NFs may not have a way of directly informing Infrastructure Environment Services, such as an orchestration system that allocates resources for NFs, whether the NF resources are being exhausted or minimally utilized. Use of third-party applications or service assurance analytics to monitor the load of NFs may not enable the system to react quickly enough to a change in the load of an NF.

A 5G core network uses a Service-Based Architecture (SBA), which utilizes a centralized discovery framework through an NF known as the Network Repository Function (NRF). An NRF may provide NF registration, management, discovery, subscription, and/or authentication services within the 5G core. For example, when a new NF, such as, for example, an Access and Mobility Management Function (AMF) is brought online, the AMF may register its reachability and services information with the NRF so that other NFs in the 5G core network are able to communicate with the AMF. When another network component, such as, for example, a Session Management Function (SMF), needs to communicate with an AMF, the SMF may send a request to the NRF to locate an available AMF and the NRF may provide the reachability and other information relating to the available AMF instances to the requesting SMF.

Implementations described herein relate to systems and methods for dynamic NF resource allocation through the NRF. NFs may be configured to report load information to the NRF directly using the SBA interface, such as the Nnrf interface, and the NRF may be configured to send an alert to an orchestration system that allocated resources for NFs in response to a load threshold being reached by a particular NF.

Thus, an NRF in a core network may be configured to register an NF, of a core network associated with a RAN, in a network function repository for the core network and obtain load information for the NF that indicates a load for the NF during a time period. The NRF may be further configured to determine that a load associated with the NF has reached a load threshold based on the load information and send an alert to the orchestration system to adjust a capacity for the network function in response. The orchestration system may then adjust the capacity of the NF in response. In some implementations, the thresholds may be set locally by the NRF. In other implementations, values for the thresholds may be received from the NF.

As an example, the load threshold may correspond to a maximum load threshold and the alert to the orchestration system may include a request to increase the capacity of the NF. As another example, the load threshold may correspond to a minimum load threshold and the alert to the orchestration system may include a request to decrease the capacity of the NF. As yet another example, the NRF may determine an average load for the network function over a time period based on the received load information, determine that the average load is greater than the average load threshold, and send a request to the orchestration system to increase the capacity of the network function, in response to determining that the average load is greater than the average load threshold. As yet another example, the NRF may determine that the average load is less than the average load threshold and send a request to the orchestration system to decrease the capacity of the network function, in response to determining that the average load is less than the average load threshold.

The load information received from the NF may include an overall NF utilization load, a processor utilization load, a memory utilization load, a storage utilization load, and/or a utilization load for a service provided by the network function, such as, for example, a discovery service, a registration service, an update service, a deregistration service, a status subscription service, a status notification service, a status un-subscription service, and/or another type of service provided by the NF. The alert sent to the orchestration system may include one or more of an identifier for the NF, an NF type for the NF, an IP address for the NF, a pod name for a pod in which the NF is deployed, an IP address for the pod, and/or other types of information relating to the NF.

In some implementations, the NRF may be configured to propagate the obtained load information for the NF to a peer NRF and/or to an up-level NRF. If a pair of NRFs is in an active-standby configuration, the active NRF may send alerts to the configuration system and the standby NRF may select not to send alerts to the orchestration system. Thus, when the standby NRF receives load information from an NF, the standby NRF may reflect the load information to the active NRF and/or may send an indication that a load threshold has been reached to the active NRF, without sending an alert to the orchestration system.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), a radio access network (RAN) 120 that includes base stations 130-A to 130-M (referred to herein collectively as "base stations 130" and individually as "base station 130"), MEC network(s) 140 that include MEC device(s) 145, core network 150 that includes cloud center device(s) 155 and an orchestration system 160, and data networks 170-A to 170-N (referred to herein collectively as "data networks 170" and individually as "data network 170").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface.

In some implementations, UE device 110 may communicate using machine-to-machine (M2M) communication, such as MTC, and/or another type of M2M communication for Internet of Things (IoT) applications. For example, UE device 110 may include a health monitoring device, an asset tracking device, a traffic management device, a climate controlling device, a device controlling an electronic sign, a device controlling a manufacturing system, a device controlling a security system, a device controlling a power system, a device controlling a financial transaction system, and/or another type of electronic device.

RAN 120 may enable UE devices 110 to connect to core network 150 via base stations 130 using cellular wireless signals. For example, RAN 120 may include one or more central units (CUs) and distributed units (DUs) (not shown in FIG. 1) that enable and manage connections from base stations 130 to core network 150. RAN 120 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; Machine Type Communication (MTC) functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Base station 130 may include a 5G NR base station (e.g., a gNodeB) and/or a Fourth Generation (4G) Long Term Evolution (LTE) base station (e.g., an eNodeB). Each base station 130 may include devices and/or components configured to enable cellular wireless communication with UE devices 110. For example, base station 130 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Base station 130 may enable communication with core network 150 to enable core network 150 to authenticate UE device 110 with a subscriber management device (e.g., Home Subscriber Server (HSS) in 4G, Unified Data Management (UDM) in 5G, etc.).

MEC network 140 may be associated with one or more base stations 130 and may provide MEC services for UE devices 110 attached to the one or more base stations 130. MEC network 140 may be in proximity to the one or more base stations 130 from a geographic and network topology perspective, thus enabling low latency communication with UE devices 110 and/or base stations 130. As an example, MEC network 140 may be located on a same site as a base station 130. As another example, MEC network 140 may be geographically close to base station 130, and reachable via fewer network hops and/or fewer switches, than other base stations 130. As yet another example, MEC network 140 may be reached without having to go through a gateway device, such as a 4G Packet Data Network Gateway (PGW) or a 5G User Plane Function (UPF). MEC network 140 may include one or more MEC devices 145. MEC devices 145 may provide MEC services to UE devices 110, such as, for example, content delivery of streaming audio and/or video, cloud computing services, gaming, authentication services, etc. Furthermore, in some implementations, MEC device 145 may host NFs implementing the functionality of core network 150.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and other networks, such as data network 170. In some implementations, core network 150 may include a 5G core network. Exemplary components of a 5G core network are described below with reference to FIG. 2. In other implementations, core network 150 may include a 4G LTE core network (e.g., an evolved packet core (EPC) network).

Core network 150 may include cloud center devices 155. In other implementations, cloud center devices 155 may be implemented in a separate network connected to and accessible via core network 150. Cloud center devices 155 may be deployed in a cloud computing center and may host NFs. The components of core network 150, such as NFs, may be implemented as dedicated hardware components or as virtualized functions implemented on top of a common shared physical infrastructure using Software Defined Networking (SDN). For example, an SDN controller may implement the components of core network 150 using an adapter implementing a virtual network function (VNF) virtual machine, a Cloud Native Function (CNF) container, an event driven serverless architecture interface, and/or another type of SDN architecture. The common shared physical infrastructure may be implemented using one or more devices 400 described below with reference to FIG. 4 in cloud center devices 155. Additionally, or alternatively, some, or all, of the common shared physical infrastructure may be implemented using one or more devices 400 implemented in MEC devices 145 in MEC network 140.

Orchestration system 160 may include one or more computer devices, such as server devices, to orchestrate deployment of NFs in core network 150. For example, orchestration system 160 may include a container orchestration platform to configure and automate container deployment, scaling, and/or management. For example, the container orchestration platform may deploy a NF instances in containers based on NF images stored in an NF image repository. Orchestration system 160 may allocate resources to a particular NF instance, such as processor time, memory, storage, network bandwidth, and/or other types of hardware resources. Furthermore, orchestration system 160 may manage communication between different NF instances using a service mesh. The container orchestration platform may organize containers into groups called pods and the service mesh may deploy a service proxy in the same pod as a microservice container to enable the microservice to communicate with other microservices. Orchestration system 160 may adjust the resources allocated to an NF instance based on load information received from an NRF in core network 150.

Data network 170 may include a packet data network. Data network 170 may be associated with an Access Point Name (APN) and UE device 110 may request a connection to data network 170 using the APN. Data network 170 may include, and/or be connected to and enable communication with, a local area network (LAN), a wide area network (WAN), a metropolitan area network (MAN), an autonomous system (AS) on the Internet, an optical network, a cable television network, a satellite network, an ad hoc network, an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
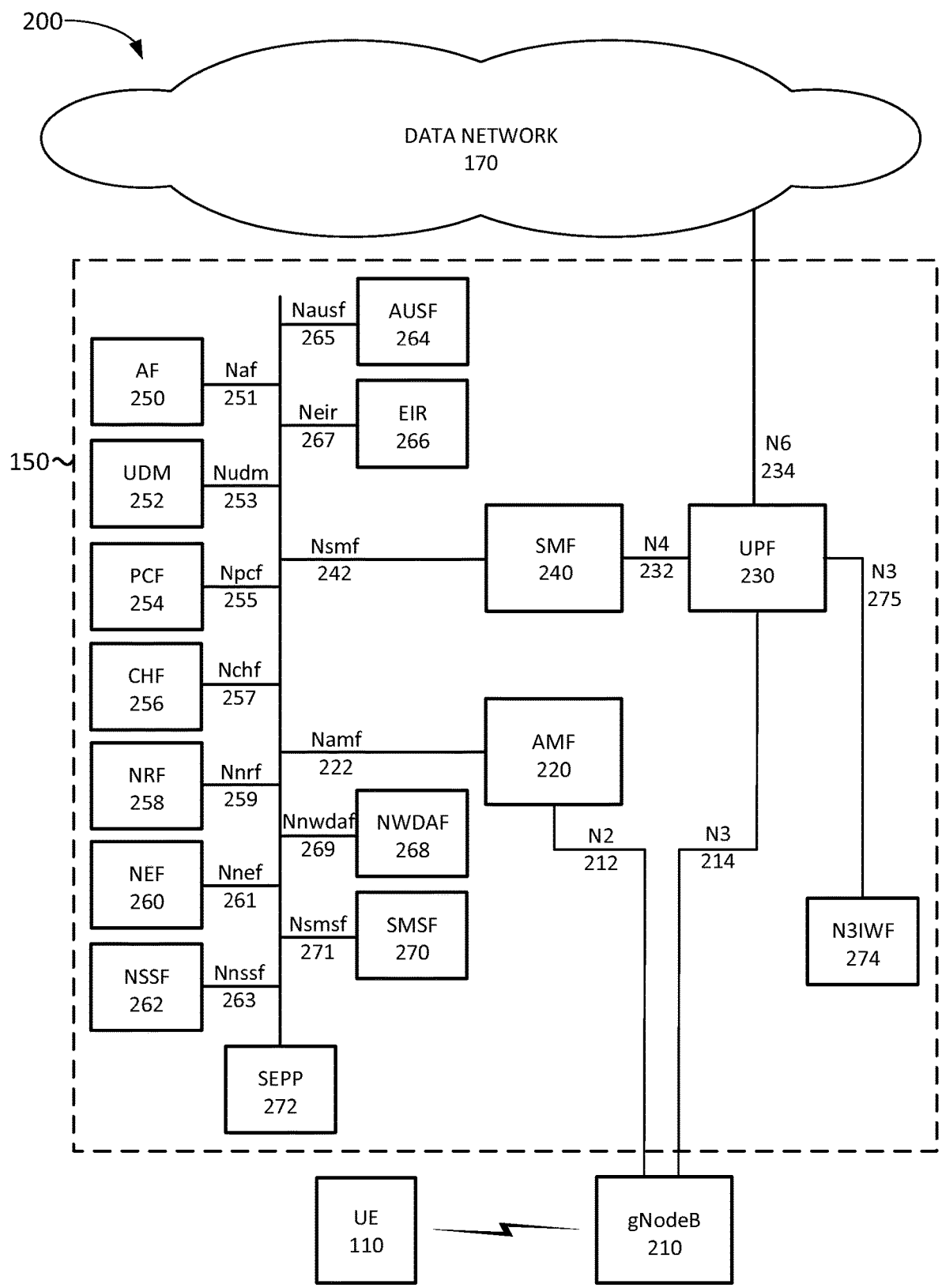
FIG. 2 is a diagram illustrating components of a core network according to an implementation described herein.

FIG. 2 illustrates a system 200 that includes exemplary components of core network 150 in the context of environment 100 according to an implementation described herein. As shown in FIG. 2, system 200 may include UE device 110, gNodeB 210, core network 150, and data network 170.

gNodeB 210 (corresponding to base station 130) may include one or more devices (e.g., base stations) and other components and functionality that enable UE device 110 to wirelessly connect to core network 150 using 5G NR Radio Access Technology (RAT). For example, gNodeB 210 may service one or more cells, with each cell being served by a wireless transceiver with an antenna array configured for mm-wave wireless communication. gNodeB 210 may communicate with AMF 220 using an N2 interface 212 and communicate with UPF 230 using an N3 interface 214.

Core network 150 may include an Access and Mobility Function (AMF) 220, a User Plane Function (UPF) 230, an SMF 240, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, core network 150 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274.

AMF 220 may perform registration management, connection management, reachability management, mobility management, lawful intercepts, Short Message Service (SMS) transport between UE device 110 and SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network (e.g., data network 170), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 210), and/or perform other types of user plane processes. UPF 230 may communicate with SMF 240 using an N4 interface 232 and connect to data network 170 using an N6 interface 234. UPF 230 may be configured to report, to CHF 256 via SMF 240, parameters of a data flow that are used for determining charges for the data flow such as, for example, the network slice, QoS class, and/or application identifier associated with the data flow. Furthermore, UPF 230 may be configured to measure and report, to CHF 256 via SMF 240, performance parameters such as, for example, data throughput, data rate, latency, jitter, etc.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251, also referred to as an NG5 interface.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. Furthermore, PCF 254 may obtain an enterprise policy that includes a mapping between applications associated with the enterprise and QoS classes and may provide the enterprise policy to UPF 230 via SMF 240.

CHF 256 may perform charging and/or billing functions for core network 150. For example, CHF 256 may generate a charging record for UE device 110 based on data flow information associated with UE device 110. CHF 256 may be accessible via Nchf interface 257. CHF 256 may receive data flow information from UPF 230 via SMF 240. Furthermore, CHF 256 may receive policy information relating to policies applied to data flows associated with UE device 110 from PCF 254. CHF 256 may provide the generated charging records to billing system 170.

NRF 258 may support a service discovery function and maintain profiles of available network function (NF) instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. NRF 258 may be accessible via an Nnrf interface 259. Furthermore, NRF 258 may receive load information from NFs and may determine whether the load information has reached a load threshold. If NRF 258 determines that a load threshold has been reached for an NF, NRF 258 may send an alert to orchestration system 160 to adjust the resources allocated to the NF.

NEF 260 may expose capabilities and events to other NFs, including $3^{rd}$ party NFs, AFs, edge computing NFs, and/or other types of NFs. Furthermore, NEF 260 may secure provisioning of information from external applications to core network 150, translate information between core network 150 and devices/networks external to core network 150, support a Packet Flow Description (PFD) function, and/or perform other types of network exposure functions. NEF 260 may be accessible via Nnef interface 261.

NSSF 262 may select a set of network slice instances to serve a particular UE device 110, determine network slice selection assistance information (NSSAI), determine a particular AMF 220 to serve a particular UE device 110, and/or perform other types of processing associated with network slice selection or management. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via Neir interface 267.

NWDAF 268 may collect analytics information associated with RAN 120 and/or core network 150. For example, NWDAF 268 may collect accessibility KPIs (e.g., an RRC setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi Access Point. N3IWF 274 may facilitate handovers for UE device 110 between RAN 120 and the non-3GPP access device. N3IWF 274 maybe accessible via N3 interface 275.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150. For example, core network 150 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, core network 150 may include a reference point architecture that includes point-to-point interfaces between particular function nodes.

Figure 3:
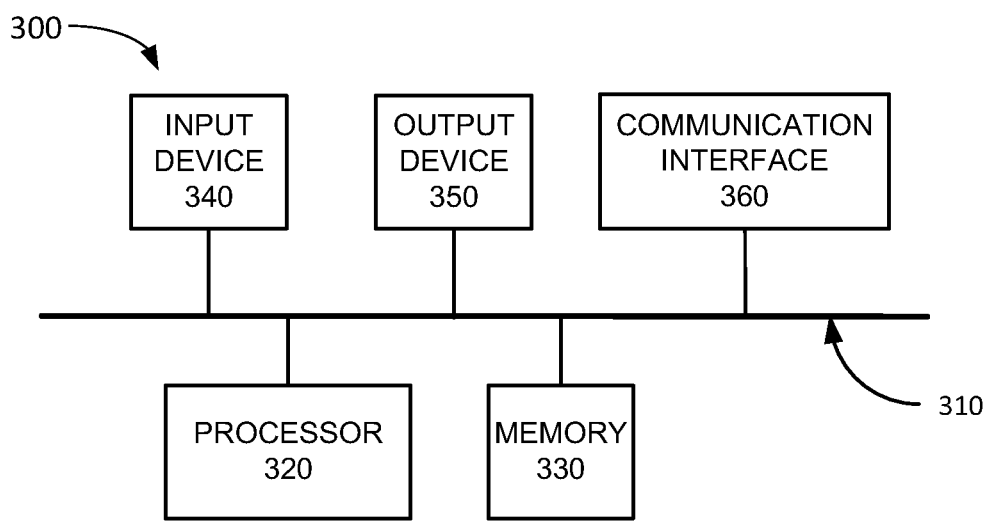
FIG. 3 is a diagram illustrating exemplary components of a device that may be included in a component of an environment or a core network according to an implementation described herein.

FIG. 3 illustrates example components of a device 300 according to an implementation described herein. UE device 110, base station 130, MEC device 145, cloud center device 155, orchestration system 160, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, and/or other components of core network 150, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to monitoring loads of NFs and dynamic allocation of NF resources in mobile wireless networks. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
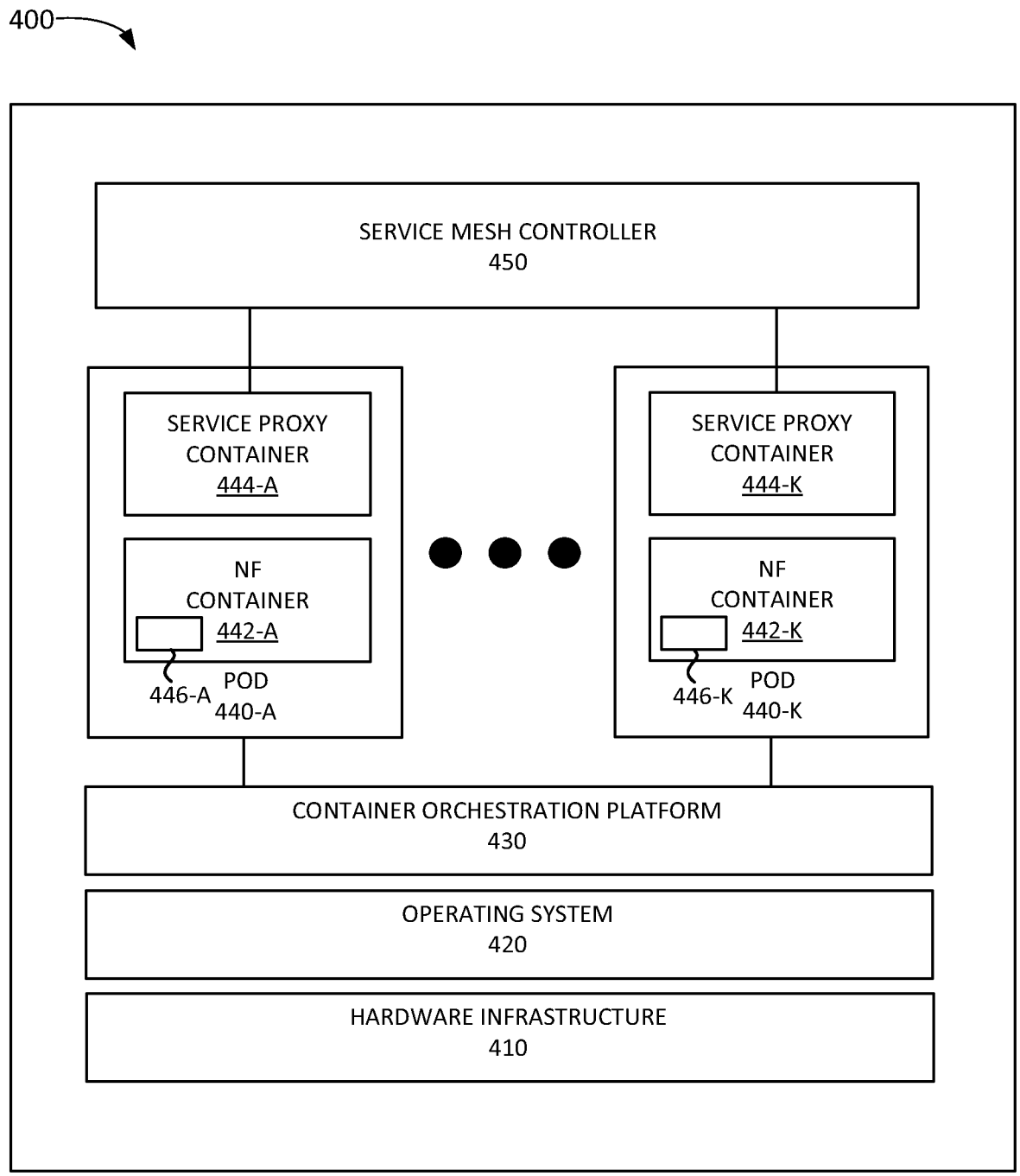
FIG. 4 is a diagram illustrating exemplary components of a node hosting a network function according to an implementation described herein.

FIG. 4 is a diagram illustrating exemplary components of a container node 400 used to deploy container-based NFs. As shown in FIG. 4, container node 400 may include a hardware infrastructure 410, an operating system 420, a container orchestration platform 430, pods 440-A to 440-K (referred to herein collectively as "pods 440" and individually as "pod 440"), and a service mesh controller 450.

Container orchestration platform 430 may be implemented on top of operating system 420 and the underlying hardware infrastructure 410 of cloud center device 155 or MEC device 145. Container orchestration platform 430 may facilitate the creation, configuration, deployment and/or scaling of containers. For example, container orchestration platform 430 may deploy additional instances of an NF based on increased load and may manage the deployed instances across different physical devices, referred to as nodes. Container orchestration platform 430 may organize containers into groups called pods 440. Pod 440 may guarantee that containers in the pod are collocated in the same node. Examples of container orchestration platforms include Kubernetes (k8s), Docker Swarm, Amazon Elastic Container Service (ECS), Helios, Apache Mesos, Red Hat Open Shift Container Platform, Cloudify, etc.

Pod 440 may include an NF container 442 and a service proxy container 444. NF container 442 may include an instance of a particular NF. Service proxy container 444 may function as a service proxy for pod 440 by intercepting messages sent to NF container 442 and/or messages sent by NF container 442. Service proxy container 444 may enforce load balancing, routing, resiliency, and/or other types of rules received from service mesh controller 450. Moreover, service proxy container 444 may report a set of metrics to service mesh controller 450. The set of metrics may include, for example, a measured network latency associated with the particular NF, a measured resource use associated with the NF (e.g., CPU time, GPU time, memory use, etc.), a number of times the NF was used in a particular time period, the number of different UE devices 110 that used the particular NF e in the particular time period, and/or other types of metrics that may be used to measure the performance of a particular NF instance.

Service mesh controller 450 may control the service mesh associated with pods 440. When a large number of containers are deployed, communication between the NFs provided by the containers may become complex. Container orchestration platform 430 may not provide the necessary infrastructure for such communication. A service mesh system may be deployed to provide an infrastructure layer to enable communication between container-based microservices. Examples of service mesh systems include Istio, Consul, Kuma, Linkerd, Maesh, Grey Matter, etc. Service mesh controller 450 may include, for example, a service proxy manager to manage connectivity in a service mesh of NFs via service proxy container 444, a telemetry engine to collect telemetry data such as load information associated with the NF, and/or a key and certificate authority to manage keys and certificates in the service mesh.

The NF instance in NF container 442 may thus report telemetry data, including load information, via the service mesh using service proxy container 444. However, reporting load information via the service mesh may be slow and/or inefficient. Therefore, the NF instance in NF container 442 may include a load reporting module 446. Load reporting module 446 may monitor the load of the NF instance and report the load at particular intervals to NRF 258 via Nnrf interface 259. Thus, load reporting module 446 may report the load information directly to NRF 258 using the SBA interface for the 5G core network. Load reporting module 446 may report one or more of an overall NF utilization load, a processor utilization load, a memory utilization load, a storage utilization load, and/or a utilization load for a service provided by the network function, such as, for example, a discovery service, a registration service, an update service, a deregistration service, a status subscription service, a status notification service, a status un-subscription service, and/or another type of service provided by the NF Although FIG. 4 shows exemplary components of container node 400, in other implementations, container node 400 may include fewer components, different components, differently arranged components, or additional components than depicted in FIG. 4. Additionally, or alternatively, one or more components of container node 400 may perform functions described as being performed by one or more other components container node 400.

Figure 5:
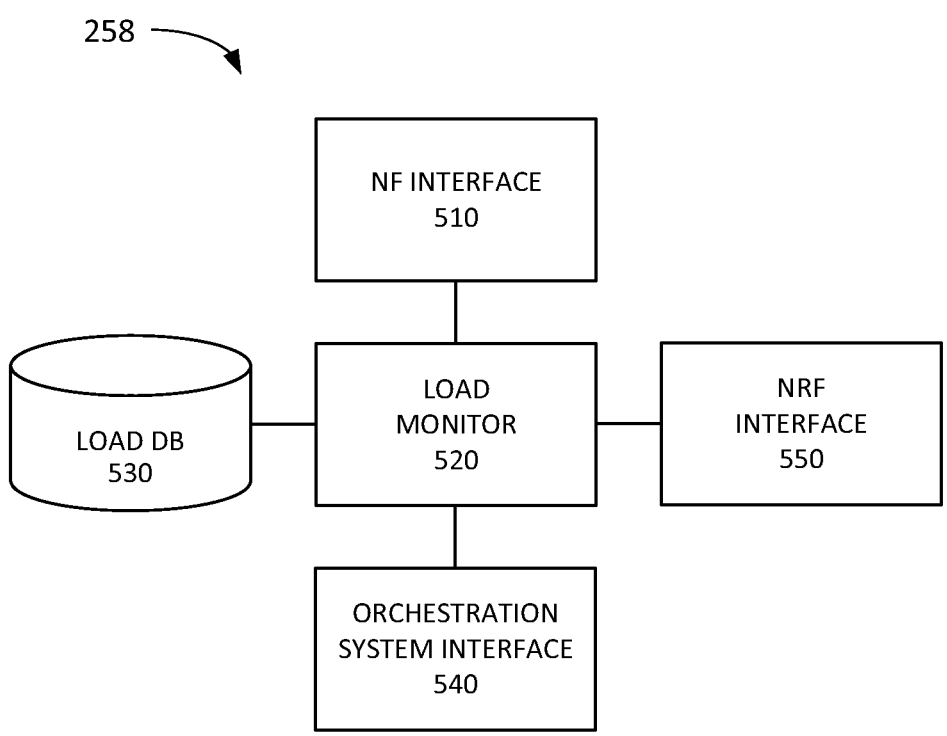
FIG. 5 is a diagram illustrating exemplary components of a network repository function according to an implementation described herein.

FIG. 5 is a diagram illustrating exemplary components of NRF 258. The components of NRF 258 may be implemented, for example, via processor 320 executing instructions from memory 330. Alternatively, some or all of the components of NRF 258 may be implemented via hardwired circuitry. As shown in FIG. 5, NRF 258 may include an NF interface 510, a load monitor 520, a load database (DB) 530, an orchestration system interface 540, and an NRF interface 550.

NF interface 510 may be configured to interface with NFs in core network 150. For example, NF interface 510 may implement Nnrf interface 259. NF interface 510 may receive a registration message from an NF after the NF becomes activated in core network 150. Furthermore, NF interface 510 may receive load information for the load associated with the NF at particular intervals and provide the load information to load monitor 520.

Load monitor 520 may monitor loads associated with NFs based on information stored in load DB 530. Load DB 530 may store load information for NFs registered with NRF 258. Exemplary information that may be stored in load DB 530 is described below with reference to FIG. 6. Load monitor 520 may monitor a set of load thresholds for each NF registered with NRF 258 and may determine whether a particular load metric has reached a load threshold associated with the particular load metric. If load monitor 520 determines that a load threshold has been reached for an NF, load monitor 520 may send an alert to orchestration system 160 to adjust the capacity of the NF.

Orchestration system interface 540 may be configured to communicate with orchestration system 160. For example, orchestration system interface 540 may send an alert to orchestration system 160 indicating that a load threshold for an NF has been reached along with a request to adjust the capacity of the NF. The alert may include, for example, an identifier for the NF, an NF type for the NF, an IP address for the NF, a pod name for a pod in which the NF is deployed, an IP address for the pod, and/or other types of information relating to the NF. Furthermore, the alert may include information identifying the load threshold that has been reached along with a recommendation to make an adjustment to the capacity of the NF.

NRF interface 550 may be configured to communicate with other NRFs 258 in core network 150. For example, core network 150 may include two NRFs 258, with a first NRF 258 designated as the active NRF and the second NRF 258 designated as the standby NRF. The standby NRF may act as a backup NRF in case the active NRF fails. The two NRFs may share load information received from NFs. Thus, when a first NRF receives load information from an NF, the first NRF may propagate the load information to the second NRF via NRF interface 550. Furthermore, if the first NRF is designated as the standby NRF, the first NRF may select not to send alerts relating to load thresholds to orchestration system 160.

Although FIG. 5 shows exemplary components of NRF 258, in other implementations, NRF 258 may include fewer components, different components, additional components, or differently arranged components than depicted in FIG. 5. Additionally, or alternatively, one or more components of NRF 258 may perform one or more tasks described as being performed by one or more other components of NRF 258.

FIG. 6 is a diagram illustrating exemplary information stored in load DB 530. As shown in FIG. 6, load DB 530 may include one or more NF load records 600. Each NF load record 600 may store load information relating to a particular NF. NF load record 600 may include an NF identifier (ID) field 610, an NF type field 612, an NF IP address field 614, an NF pod name field 616, an NF pod IP address field 618, an overall load field 620, a processor load field 622, a memory load field 624, a storage load field 626, a discovery service load field 628, a registration service load field 630, an update service load field 632, a deregistration service load field 634, a status subscription service load field 636, a status notification service load field 638, a status un-subscription service load field 640, and a load thresholds table 650.

NF ID field 610 may store an ID for an NF instance. NF type field 612 may store information identifying an NF type for the NF instance (e.g., AMF, SMF, UPF, etc.). NF IP address field 614 may store an IP address for the NF instance. NF pod name field 616 may store the name of pod 440 that hosts the NF instance. NF pod IP address field 618 may store an IP address for pod 440 that hosts the NF instance.

Overall load field 620 may store information identifying an overall load for the NF instance at a particular time periods up to a most recent time period (e.g., the most recent load information received from the NF instance). Thus, each load field may store a time series of load values for the NF instance. The time series may be used, for example, to determine an average load value. The load values may be expressed as a percentage of used capacity, a percentage of available capacity, as an absolute value of units being consumed (e.g., number of bytes of memory being used, number of active user sessions, etc.), as a relative value of units being consumed, and/or using another type of measure of load.

Processor load field 622 may store information identifying a processor load for the NF instance at a particular time periods up to a most recent time period. Memory load field 624 may store information identifying a memory load for the NF instance at a particular time periods up to a most recent time period. Storage load field 626 may store information identifying a storage load for the NF instance at a particular time periods up to a most recent time period.

Discovery service load field 628 may store information identifying a load associated with a discovery service provided by the NF instance, such as a service enabling UE devices 110, and/or other NFs, discover the NF instance. Registration service load field 630 may store information identifying a load associated with a registration service provided by the NF instance. Update service load field 632 may store information identifying a load associated with an update service provided by the NF instance. Deregistration service load field 634 may store information identifying a load associated with a deregistration service provided by the NF instance. Status subscription service load field 636 may store information identifying a load associated with a status subscription service provided by the NF instance. Status notification service load field 638 may store information identifying a load associated with a status notification service provided by the NF instance. Status un-subscription service load field 640 may store information identifying a load associated with a status un-subscription service provided by the NF instance.

Load thresholds table 650 may store a set of load thresholds for the NF instance. In some implementations, the load thresholds may be set locally by NRF 258. In other implementations, values for the load thresholds may be received from the NF instance and/or from anther source, such as, for example, orchestration system 160. As an example, the NF instance may set a maximum load threshold based on the capacity of the NF instance, such as the amount of resources that have been allocated to the NF instance by orchestration system 160. As another example, orchestration system 160 may set a minimum load threshold for the NF instance based on a minimum load required to justify allocation of a particular amount of resources to the NF.

Load thresholds table 650 may include a minimum load column 652, an average load column 654, and a maximum load column 656. Minimum load column 652 may store minimum load thresholds for each of the corresponding specific loads of fields 620-640. Average load column 654 may store average load thresholds for each of the corresponding specific loads of fields 620-640. Maximum load column 654 may store maximum load thresholds for each of the corresponding specific loads of fields 620-640.

Although FIG. 6 shows exemplary components of load DB 530, in other implementations, load DB 530 may include fewer components, different components, additional components, or differently arranged components than depicted in FIG. 6.

Figure 7:
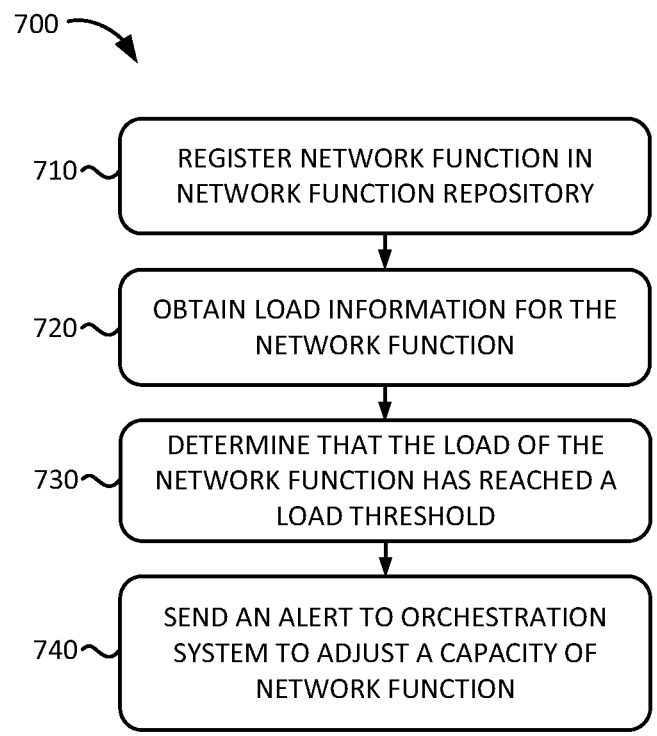
FIG. 7 illustrates a flowchart for monitoring the load of a network function according to an implementation described herein.

FIG. 7 illustrates a flowchart of a process 700 for monitoring the load of a network function according to an implementation described herein. In some implementations, process 700 of FIG. 7 may be performed by NRF 258. In other implementations, some or all of process 600 may be performed by another device or a group of devices separate from NRF 258.

As shown in FIG. 7, process 700 may include registering an NF in a network function repository (block 710). For example, NRF 258 may receive a registration request from an NF via Nnrf interface 259. In response, NRF 258 may register the NF in the network function repository. In some implementations, NRF 258 may instruct the NF to start reporting load information over the Nnrf interface 259. In other implementations, the NF may be configured to automatically start reporting load information at particular intervals. NRF 258 may generate an NF load record 600 for the NF in load DB 530.

Process 700 may further include obtaining load information for the NF (block 720). For example, NRF 258 may receive, at particular time intervals, load information from the NF and may store the received load information in NF load record 600 associated with the NF. Process 700 may further include determining that the load of the NF has reached a load threshold (block 730) and sending an alert to an orchestration system to adjust a capacity of the NF function in response (block 740). For example, NRF 258 may determine that one or more of the load thresholds stored in load thresholds table 650 has been reached and send, in response, an alert to orchestration system 160 to adjust a capacity of the NF. The alert may include, for example, an identifier for the NF, an NF type for the NF, an IP address for the NF, a pod name for a pod in which the NF is deployed, an IP address for the pod, and/or other types of information relating to the NF. Furthermore, the alert may include information identifying the load threshold that has been reached along with a recommendation to make an adjustment to the capacity of the NF.

As an example, if a maximum load threshold for a processing load for the NF has been reached, an alert may include a recommendation to increase the processor resources allocated to the NF. As another example, if a minimum load threshold for a storage load for the NF has been reached, an alert may include a recommendation to decrease the storage resources allocated to the NF. As yet another example, NRF 258 may determine an average load for the NF (e.g., average overall load, average processor load, average memory load, average load for a particular service, etc.). If the average load is greater than an average load threshold, an alert may include a recommendation to increase the capacity of the network function, in response to determining that the average load is greater than the average load threshold. If the average load is less than an average load threshold, the alert may include a recommendation to decrease the capacity of the network function.

Orchestration system 160 may adjust the capacity of the NF based on the received alert. For example, orchestration system 160 may instruct container orchestration platform 430 associated with node(s) 400 that host the NF instance to either increase or decrease the allocated resources for the NF by either increasing or decreasing the processor time and/or number of processor cores allocated to the NF, increasing or decreasing the amount of memory and/or storage space allocated to the NF, increasing or decreasing the network bandwidth allocated to the NF, increasing or decreasing the number of pods 440 hosting the NF instance, and/or otherwise adjusting the resources allocated to the NF.

Figure 8:
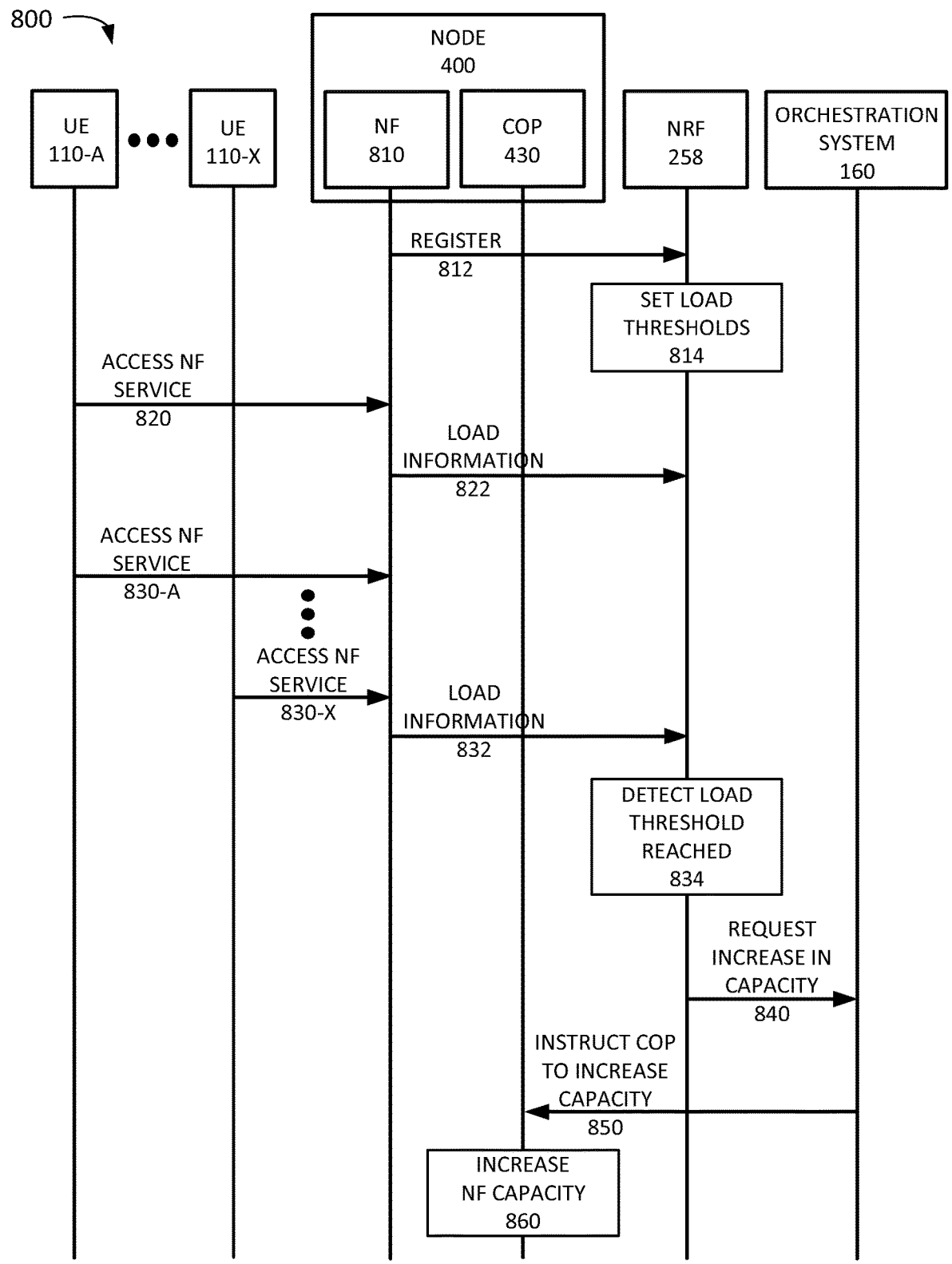
FIG. 8 is a diagram of a signal flow according to an implementation described herein.

FIG. 8 is a diagram of a signal flow 800 according to an implementation described herein. As shown in FIG. 8, signal flow 800 may include NF 810, implemented in node 400, sending a registration request to NRF 258 (signal 812). NF 810 may correspond to, for example, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, and/or another type of NF in core network 150. In response, NRF 258 may register NF 810 in the network repository and may set load thresholds for NF 810 (block 814). UE devices 110 may access the services of NF 810 (signal 820) and NF 810 may report load information, for particular loads associated with NF 810, to NRF 258 (signal 822).

At a later time, more UE devices 110 (e.g., UE devices 110-A to 110-X) may access the services of NF 810 (signals 830-Z to 830-X) and NF 810 may experience an increase in load that results in the capacity of NF 810 being exhausted. NF 810 may report the increase in load in the next message reporting the load information to NRF 258 (signal 832). NRF 258 may determine that a maximum load threshold associated with NF 810 has been reached (block 834). In response NRF 258 may send a request to orchestration system 160 to increase the capacity of NF 810 (signal 840). Orchestration system 160 may instruct container orchestration platform 430 in node 400 hosting NF 810 to allocate additional processor time, memory, and/or network bandwidth (signal 850) and, in response, container orchestration platform 430 in node 400 hosting NF 810 may increase the allocated resource for NF 810 (block 860).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signals with respect to FIG. 8, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   registering, by a device, a network function, of a core network associated with a radio access network, in a network function repository for the core network;
   obtaining, by the device, load information for the network function, wherein the load information indicates a load associated with the network function during a time period;
   determining, by the device, that the load associated with the network function has reached a threshold based on the load information, wherein the threshold corresponds to a maximum load threshold, a minimum load threshold, or an average load threshold; and
   sending, by the device, an alert to an orchestration system to adjust a capacity for the network function, in response to determining that the load associated with the network function has reached the threshold, wherein sending the alert to the orchestration system to adjust the capacity for the network function includes:
      sending a request to the orchestration system to increase the capacity of the network function when the threshold corresponds to the maximum load threshold or when the threshold corresponds to the average load threshold and an average load for the network function is greater than the average load threshold, or
      sending a request to the orchestration system to decrease the capacity of the network function when the threshold corresponds to the minimum load threshold or when the threshold corresponds to the average load threshold and an average load for the network function is less than the average load threshold.

2. The method of claim 1, wherein the device includes a Network Repository Function.

3. The method of claim 1, wherein the load information includes at least one of:
   an overall network function utilization load,
   a processor utilization load,
   a memory utilization load,
   a storage utilization load, or
   a utilization load for a service provided by the network function.

4. The method of claim 3, wherein the service provided by the network function includes at least one of:
   a discovery service,
   a registration service,
   an update service,
   a deregistration service,
   a status subscription service,
   a status notification service, or
   a status un-subscription service.

5. The method of claim 1, wherein the threshold corresponds to the maximum load threshold and wherein sending the alert to the orchestration system to adjust the capacity for the network function includes:
   sending the request to the orchestration system to increase the capacity of the network function.

6. The method of claim 1, wherein the threshold corresponds to the minimum load threshold and wherein sending the alert to the orchestration system to adjust the capacity for the network function includes:
   sending the request to the orchestration system to decrease the capacity of the network function.

7. The method of claim 1, wherein the threshold corresponds to the average load threshold, the method further comprising:
   determining the average load for the network function over a time period based on the received load information; and
   determining that the average load is greater than the average load threshold; and wherein sending the alert to the orchestration system to adjust the capacity for the network function includes:
   sending the request to the orchestration system to increase the capacity of the network function, in response to determining that the average load is greater than the average load threshold.

8. The method of claim 1, wherein the threshold corresponds to the average load threshold, the method further comprising:
   determining the average load for the network function over a time period based on the received load information;
   determining that the average load is less than the average load threshold; and wherein sending the alert to the orchestration system to adjust the capacity for the network function includes:
   sending the request to the orchestration system to decrease the capacity of the network function, in response to determining that the average load is less than the average load threshold.

9. The method of claim 1, further comprising:
   receiving a value for the threshold from the network function.

10. The method of claim 1, wherein the alert to the orchestration system includes at least one of:
    an identifier for the network function,
    a network function type for the network function,
    an Internet Protocol (IP) address for the network function,
    a pod name for a pod in which the network function is deployed, or
    an IP address for the pod.

11. The method of claim 1, wherein the device includes a Network Repository Function (NRF), the method further comprising:
    propagating the obtained load information for the network function to a peer NRF.

12. The method of claim 11, further comprising:
determining that the NRF has been designated as a standby NRF and that the peer NRF has been designated as an active NRF; and
selecting to not send alerts to the orchestration system, in response to determining that the NRF has been designated as the standby NRF.

13. A device comprising:
a processor configured to:
register a network function, of a core network associated with a radio access network, in a network function repository for the core network;
obtain load information for the network function, wherein the load information indicates a load associated with the network function during a time period;
determine that the load associated with the network function has reached a threshold based on the load information, wherein the threshold corresponds to a maximum load threshold, a minimum load threshold, or an average load threshold; and
send an alert to an orchestration system to adjust a capacity for the network function, in response to determining that the load associated with the network function has reached the threshold, wherein, when sending the alert to the orchestration system to adjust the capacity for the network function, the processor is configured to:
send a request to the orchestration system to increase the capacity of the network function when the threshold corresponds to the maximum load threshold or when the threshold corresponds to the average load threshold and an average load for the network function is greater than the average load threshold, or
send a request to the orchestration system to decrease the capacity of the network function when the threshold corresponds to the minimum load threshold or when the threshold corresponds to the average load threshold and an average load for the network function is less than the average load threshold.

14. The device of claim 13, wherein the device includes a Network Repository Function.

15. The device of claim 13, wherein the load information includes at least one of:
an overall network function utilization load,
a processor utilization load,
a memory utilization load,
a storage utilization load, or
a utilization load for a service provided by the network function.

16. The device of claim 13, wherein the threshold corresponds to the maximum load threshold and wherein, when sending the alert to the orchestration system to adjust the capacity for the network function, the processor is further configured to:
send the request to the orchestration system to increase the capacity of the network function.

17. The device of claim 13, wherein the threshold corresponds to the minimum load threshold and wherein, when sending the alert to the orchestration system to adjust the capacity for the network function, the processor is further configured to:
send the request to the orchestration system to decrease the capacity of the network function.

18. The device of claim 13, wherein the processor is further configured to:
receive a value for the threshold from the network function.

19. The device of claim 13, wherein the device includes a Network Repository Function (NRF), and wherein the processor is further configured to:
propagate the obtained load information for the network function to a peer NRF;
determine that the NRF has been designated as a standby NRF and that the peer NRF has been designated as an active NRF; and
select to not send alerts to the orchestration system, in response to determining that the NRF has been designated as the standby NRF.

20. A system comprising:
a first device configured to:
implement a network function of a core network associated with a radio access network; and
provide load information for the network function to a network repository function (NRF), wherein the load information indicates a load associated with the network function during a time period; and
a second device configured to:
implement the NRF;
register the network function at the NRF;
receive the load information from the network function;
determine that the load associated with the network function has reached a threshold based on the load information, wherein the threshold corresponds to a maximum load threshold, a minimum load threshold, or an average load threshold; and
send an alert to an orchestration system to adjust a capacity for the network function, in response to determining that the load associated with the network function has reached the threshold, wherein, when sending the alert to the orchestration system to adjust the capacity for the network function, the second device is configured to:
send a request to the orchestration system to increase the capacity of the network function when the threshold corresponds to the maximum load threshold or when the threshold corresponds to the average load threshold and an average load for the network function is greater than the average load threshold, or
send a request to the orchestration system to decrease the capacity of the network function when the threshold corresponds to the minimum load threshold or when the threshold corresponds to the average load threshold and an average load for the network function is less than the average load threshold.

* * * * *